US011315316B2

(12) United States Patent
Babu J D

(10) Patent No.: US 11,315,316 B2
(45) Date of Patent: *Apr. 26, 2022

(54) CENTRALIZED RENDERING

(71) Applicant: Magic Leap, Inc., Plantation, FL (US)

(72) Inventor: Praveen Babu J D, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,971

(22) Filed: Apr. 21, 2021

(65) Prior Publication Data

US 2021/0312708 A1    Oct. 7, 2021

Related U.S. Application Data

(63) Continuation of application No. 15/940,892, filed on Mar. 29, 2018, now Pat. No. 11,017,592.

(60) Provisional application No. 62/479,134, filed on Mar. 30, 2017.

(51) Int. Cl.
| *G06T 17/00* | (2006.01) |
| *G06T 15/00* | (2011.01) |
| *G06F 9/44* | (2018.01) |
| *G06F 8/38* | (2018.01) |
| *G06T 19/00* | (2011.01) |
| *G09G 5/14* | (2006.01) |
| *G06F 3/147* | (2006.01) |
| *G06T 15/50* | (2011.01) |
| *G06T 15/40* | (2011.01) |

(52) U.S. Cl.
CPC ............. *G06T 17/005* (2013.01); *G06F 8/38* (2013.01); *G06F 9/44* (2013.01); *G06T 15/005* (2013.01); *G06T 19/00* (2013.01); *G09G 5/14* (2013.01); *G06F 3/147* (2013.01); *G06T 15/40* (2013.01); *G06T 15/50* (2013.01); *G06T 2210/21* (2013.01); *G06T 2210/61* (2013.01); *G06T 2219/024* (2013.01)

(58) Field of Classification Search
CPC combination set(s) only.
See application file for complete search history.

(56) References Cited

U.S. PATENT DOCUMENTS

| 6,130,670 A | 10/2000 | Porter |
| 7,290,216 B1 | 10/2007 | Kawahara et al. |
| 7,800,614 B2 | 9/2010 | Johnson et al. |

(Continued)

FOREIGN PATENT DOCUMENTS

| JP | 2003228721 A | 8/2003 |
| JP | 2004272928 A | 9/2004 |

(Continued)

OTHER PUBLICATIONS

Final Office Action dated Aug. 25, 2020, for U.S. Appl. No. 15/940,892, filed Mar. 29, 2018, 41 pages.

(Continued)

*Primary Examiner* — Andrew G Yang
(74) *Attorney, Agent, or Firm* — Morrison & Foerster LLP

(57) ABSTRACT

A method is disclosed, the method comprising the steps of receiving, from a first client application, first graphical data comprising a first node; receiving, from a second client application independent of the first client application, second graphical data comprising a second node; and generating a scenegraph, wherein the scenegraph describes a hierarchical relationship between the first node and the second node.

18 Claims, 11 Drawing Sheets

(56) References Cited

U.S. PATENT DOCUMENTS

| | | | |
|---|---|---|---|
| 8,253,730 | B1 | 8/2012 | Carr |
| 8,275,031 | B2 | 9/2012 | Neuman |
| 9,069,554 | B2 | 6/2015 | Lioy et al. |
| 10,977,858 | B2 | 4/2021 | Babu Jd |
| 11,017,592 | B2 | 5/2021 | Babu J D |
| 2001/0012018 | A1 | 8/2001 | Hayhurst |
| 2002/0163515 | A1 | 11/2002 | Sowizral et al. |
| 2003/0076329 | A1 | 4/2003 | Beda et al. |
| 2004/0130550 | A1 | 7/2004 | Blanco et al. |
| 2004/0130552 | A1 | 7/2004 | Duluk et al. |
| 2004/0189669 | A1 | 9/2004 | David et al. |
| 2005/0182844 | A1 | 8/2005 | Johnson et al. |
| 2006/0122819 | A1 | 6/2006 | Carmel et al. |
| 2007/0057952 | A1 | 3/2007 | Swedberg et al. |
| 2007/0220168 | A1 | 9/2007 | Parsons et al. |
| 2008/0002761 | A1 | 1/2008 | Edsall et al. |
| 2008/0122838 | A1 | 5/2008 | Hoover et al. |
| 2009/0278852 | A1 | 11/2009 | Reese et al. |
| 2013/0120418 | A1 | 5/2013 | Green et al. |
| 2013/0127849 | A1 | 5/2013 | Marketsmueller et al. |
| 2014/0168218 | A1 | 6/2014 | Mitrea et al. |
| 2014/0267291 | A1 | 9/2014 | Smyth et al. |
| 2014/0313197 | A1 | 10/2014 | Peuhkurinen |
| 2015/0199788 | A1 | 7/2015 | Wolfe |
| 2016/0072716 | A1 | 3/2016 | Chow et al. |
| 2016/0093090 | A1 | 3/2016 | Shin et al. |
| 2016/0293133 | A1 | 10/2016 | Dutt |
| 2017/0153926 | A1 | 6/2017 | Callegari et al. |
| 2017/0365086 | A1 | 12/2017 | Floyd et al. |
| 2018/0114368 | A1 | 4/2018 | Marketsmueller |
| 2021/0264665 | A1 | 8/2021 | Babu Jd |

FOREIGN PATENT DOCUMENTS

| | | |
|---|---|---|
| JP | 2012503811 A | 2/2012 |
| WO | 2010035141 A2 | 4/2010 |
| WO | 2016198346 A1 | 12/2016 |
| WO | 2018183778 A1 | 10/2018 |

OTHER PUBLICATIONS

Final Office Action dated Aug. 25, 2020, for U.S. Appl. No. 16/011,413, filed Jun. 18, 2018, 21 pages.
Final Office Action dated Dec. 4, 2019, for U.S. Appl. No. 15/940,892, filed Mar. 29, 2018, 37 pages.
Final Office Action dated Dec. 4, 2019, for U.S. Appl. No. 16/011,413, filed Jun. 18, 2018, 15 pages.
International Preliminary Report on Patentability dated Dec. 30, 2020, for PCT Application No. PCT/US2019/037811 filed on Jun. 18, 2019, eight pages.
International Search Report and Written Opinion dated Sep. 9, 2019, for PCT Application No. PCT/US19/37811 filed on Jun. 18, 2019, fourteen pages.
International Search Report dated Jul. 30, 2018, for PCT Application No. PCT/US2018/25298 filed on Mar. 29, 2018, four pages.
Non-Final Office Action dated Jun. 20, 2019, for U.S. Appl. No. 15/940,892, filed Mar. 29, 2018, 34 pages.
Non-Final Office Action dated Jun. 25, 2019, for U.S. Appl. No. 16/011,413, filed Jun. 18, 2018, 14 pages.
Non-Final Office Action dated Mar. 24, 2020, for U.S. Appl. No. 15/940,892, filed Mar. 29, 2018, 38 pages.
Non-Final Office Action dated Mar. 24, 2020, for U.S. Appl. No. 16/011,413, filed Jun. 18, 2018, 18 pages.
Notice of Allowance dated Dec. 9, 2020, for U.S. Appl. No. 16/011,413, filed Jun. 18, 2018, nine pages.
Notice of Allowance dated Jan. 25, 2021, for U.S. Appl. No. 15/940,892, filed Mar. 29, 2018, eight pages.
Non-Final Office Action dated Sep. 16, 2021, for U.S. Appl. No. 17/195,393, filed Mar. 8, 2021, fourteen pages.
Eikel, B. et al., "Preprocessed Global Visibility for Real-Time Rendering on Low-End Hardware," Nov. 29, 2010, ICIAP: International Conference on Image Analysis and Processing, 17th International Conference, Naples, Italy, Sep. 9-13, 2013. Proceedings; [lecture notes in computer science; LECT.NOTES computer], Springer, Berlin, Heidelberg, pp. 622-633* the whole document*.
European Search Report dated Aug. 23, 2021, for EP Application No. 19823464.3, twelve pages.
Kurillo, G. et al., "Teleimmersive 3D Collaborative Environment for Cyberarchaeology," computer vision and pattern recognition workshops (CVPRW), 2010 IEEE computer society conference on, IEEE, Piscataway, NJ, USA, Jun. 13, 2010, pp. 23-28.
Australian Office Action dated Dec. 23, 2021, for AU Patent Application No. 2018243460, three pages.
Notice of Allowance dated Jan. 25, 2022, for U.S. Appl. No. 17/195,393, filed Mar. 8, 2021, eight pages.
Indian Office Action dated Feb. 2, 2022, for IN Application No. 201947041612, with English translation, 4 pages.
Japanese Office Action dated Feb. 14, 2022, for JP Application No. 2019553094, with English translation, 14 pages.

CENTRALIZED RENDERING

CROSS REFERENCE TO RELATED APPLICATION

This application is a continuation of U.S. patent application Ser. No. 15/940,892, filed on Mar. 29, 2018, which claims the benefit under 35 U.S.C. § 119(e) of U.S. Patent Application No. 62/479,134, filed Mar. 30, 2017, the contents of which are incorporated herein by reference in their entirety for all purposes.

FIELD

This disclosure relates in general to systems and methods for visually rendering graphical data on a display, and in particular to systems and methods for visually rendering data from multiple computer applications on a single display.

BACKGROUND

Various technologies exist for rendering graphical data of a computer application to a display. It can be desirable for these technologies to render graphical data realistically—that is, consistent with a viewer's expectations based on the physical world—and efficiently. It can also be desirable for rendering technologies to accommodate computer systems of various topologies, including, for example, computer systems in which multiple applications contribute graphical data to be displayed on a single display.

Traditional systems often fail to realistically and efficiently render content in such multiple-application systems. For example, in some such systems, rendering graphical data from multiple applications onto a single display results in the data being sorted incorrectly on the display, creating unexpected visual results that compromise the realism of the display. Further, graphical data from one application may fail to realistically interact—such as via lighting and shadowcasting effects, or via shaders—with graphical data from another application. Additionally, some such systems are limited in their ability to use rendering optimizations, such as culling of invisible surfaces, to increase computational efficiency.

Systems involving augmented reality (AR), or "mixed reality," in particular, demand better solutions to the problem of rendering graphical data from multiple applications to a single display. For example, AR systems carry the potential for multiple users to interact in shared virtual spaces, with virtual content from all users rendered to a single display It is desirable for such interactions to be believable and meaningful to users, which may require the graphical output of the AR system to be convincing and consistent with users' visual expectations; flexible enough to accommodate different types and numbers of users, user hardware, and user software, as well as different ways in which users may wish to engage with the system; and efficient enough to sustain continued operation at high frame rates, and to maximize battery life on mobile devices. Further, it may be desirable for applications and application data associated with an individual user in an AR system to remain independent of other users, both to provide security (which may be compromised by data access between untrusted users), and to maintain scalability, particularly as the number of users of a system becomes large. Moreover, such systems may benefit from minimizing the technical constraints on users and user applications; for example, limiting the hardware requirements for a user to participate in an AR system encourages more users to participate. This may be achieved by limiting the degree to which individual users, or applications running on a user's hardware, need to perform complex rendering operations—for example, by offloading such operations to shared systems, such as server-side host applications running on dedicated hardware.

BRIEF SUMMARY

Examples of the disclosure describe computer systems in which multiple applications contribute graphical data to be displayed on a single display. Examples of the disclosure can be used to render graphical data realistically—that is, consistent with a viewer's expectations based on the physical world—and efficiently. According to examples of the disclosure, first graphical data may be received from a first client application, and second graphical data may be received from a second, independent, client application. The first and second graphical data may be combined into a "centralized" data structure, such as a scenegraph, which can be used to describe relationships between nodes represented by the first and second graphical data. The centralized data structure can accordingly be used to render, to a display, a scene reflecting the first and second graphical data in a realistic and efficient manner.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1A:
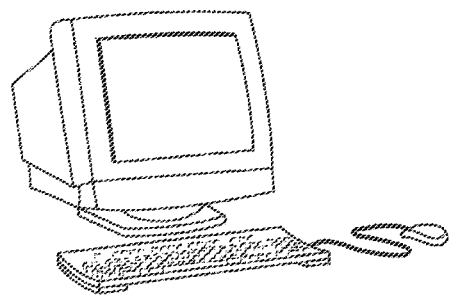
FIGS. 1A-1E illustrate example computer systems that include graphical displays according to examples of the disclosure.
Figure 1B:
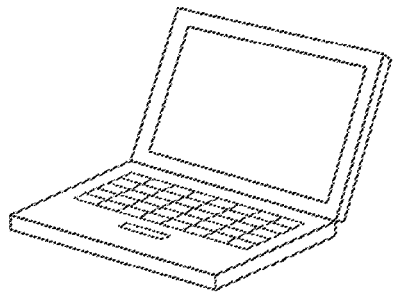
Figure 1C:
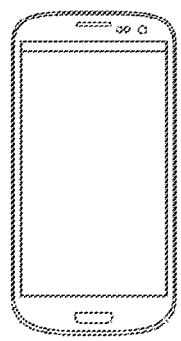
Figure 1D:
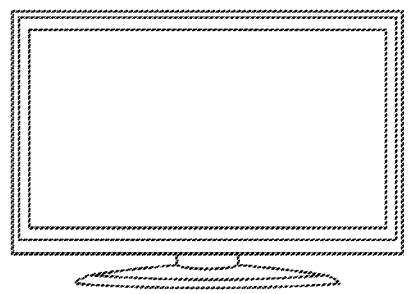
Figure 1E:
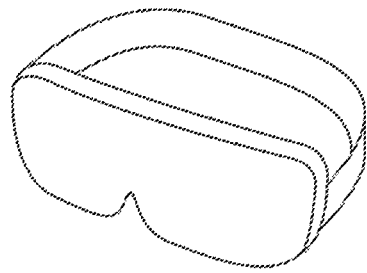

FIGS. 1A through 1E illustrate various example computer systems with displays. FIG. 1A shows an example desktop computer connected to an external monitor. FIG. 1B shows an example laptop including a display. FIG. 1C shows an example mobile device including an integrated display. FIG. 1D shows an example television including a display. FIG. 1E shows an example computer system including a head-mounted display. The disclosure is not limited to any particular type of computer system, to any particular type of display, or to any particular means of connecting a computer system to a display. The disclosure further is not limited to two-dimensional displays; in particular, three-dimensional displays, such as stereoscopic displays, are contemplated.

In some example computer systems, data to be graphically presented on a display includes data representing objects (such as 2D or 3D geometric primitives, including polygons) in a three-dimensional space ("3D data"), and presenting the 3D data on the display includes presenting an image corresponding to the objects in the three-dimensional space as viewed from a view origin oriented along a view axis (a "rendered scene"). For example, in a software application (such as a video game using a 3D engine) running on a computer system, 3D data may include spatial coordinates, orientations, and/or visual properties of objects in a three-dimensional game world, as well as data describing a view origin and view axis in the game world. 3D data may also include data relating to textures associated with objects to be rendered, shader parameters relating to the objects, and other information affecting how the objects may be displayed. The game, for example during a "render" or "draw" phase, may direct a software and/or hardware "pipeline" to present a rendered scene on a display. In such examples, it is generally desirable for the resulting image to reflect a user's expectations about the visual world. In particular, it is generally desirable for a first opaque object closer to the view origin to occlude a second object behind the first object. Objects that are not occluded correctly may confuse the user and may not clearly present where objects lie in the three-dimensional space. In some example computer systems, occlusion is achieved through sorting, in which objects closer to a view origin are sorted, or drawn, on top of objects that are further from the view origin.

Sorting multiple objects for presentation on a display, such that one object realistically occludes another, requires information about relationships among the objects—for example, spatial relationships among the objects in three-dimensional space. Some example computer systems make use of a scenegraph to represent relationships (e.g., hierarchical relationships) among one or more objects, such as objects that are to be rendered as a scene. As used herein, a scenegraph is any data structure that represents such relationships. For example, in a scenegraph, objects to be rendered may be represented as nodes in a graph, with relationships among the nodes representing logical or spatial relationships among the objects. A renderer can then traverse the scenegraph, according to techniques known in the art, to display the objects in a manner that will achieve proper occlusion. In some examples, a scenegraph is an intermediary data structure that sits between an application that includes 3D data, and a renderer for rendering that 3D data to a screen: in some examples, the application writes scene information to the scenegraph, and the scenegraph may later be used by the renderer to render the scene.

Figure 2A:
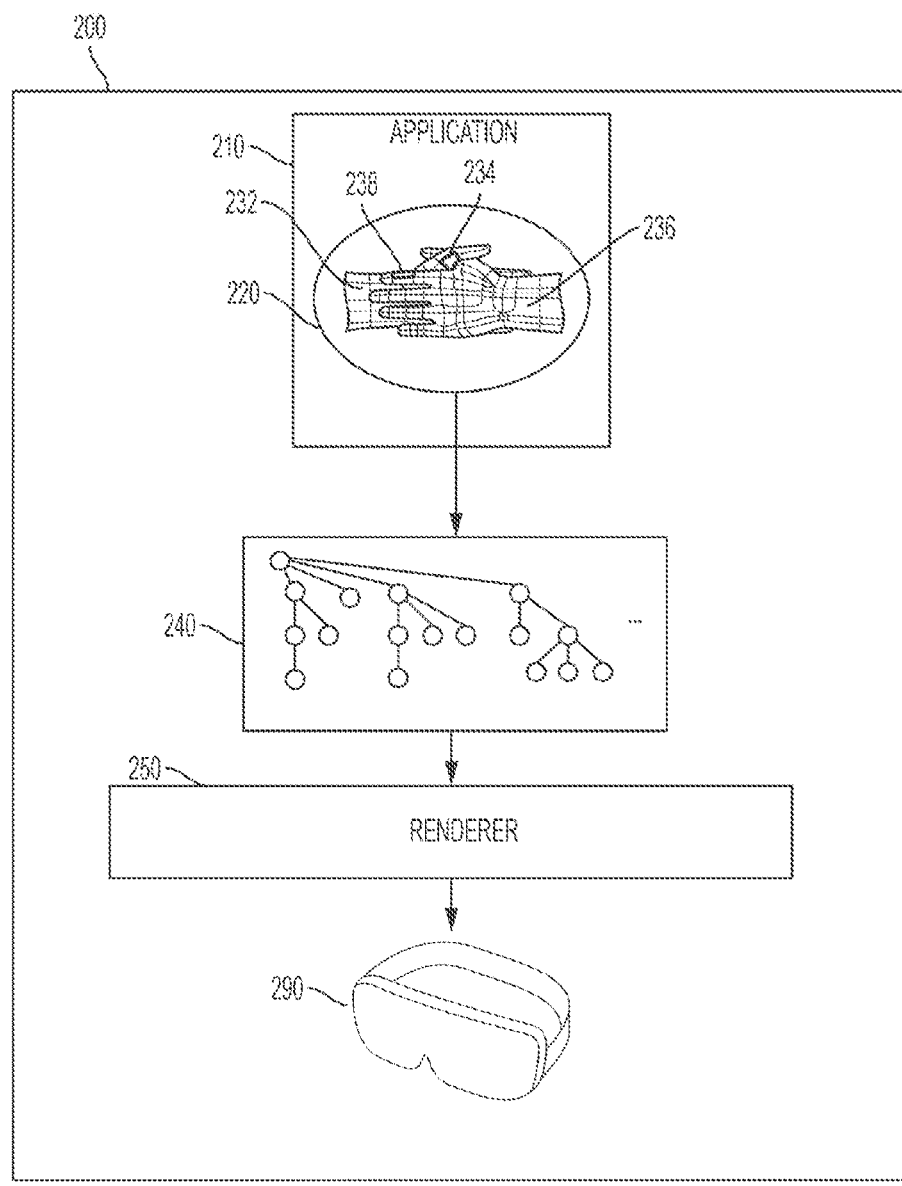
FIG. 2A shows an example flow of data in an example computer system according to examples of the disclosure.

FIG. 2A shows an example flow of data in an example computer system 200. In system 200, a single application 210 can write data to a scenegraph 240, which a renderer 250 can use to render objects 220 to a display 290. For example, objects 220 may include a number of objects (e.g., polygons) that together comprise a 3D representation of two human hands, hand 232 and hand 236; and the application may direct, for example during a render or draw phase, objects 220 to be rendered on the display from the perspective of a view origin oriented along a view axis. In the example, hand 232 and hand 236 are interlocked in a handshake; because of the relative positioning of the hands, the viewer expects some portions of hand 232 to occlude portions of hand 236, and some polygons comprising hand 236 to occlude portions of hand 232, with respect to the view origin and the view axis. Application 210 can write to the scenegraph 240 information describing relationships among objects 220, such as spatial relationships among the polygons comprising objects 220, which can be used to identify which polygons should occlude others—that is, which polygons should be sorted to display on top of others. For example, scenegraph 240 could reflect that polygon 234 (which belongs to hand 232) is positioned between the view origin and the polygons comprising hand 236, and thus should occlude those polygons in hand 236; and that polygon 238 (which belongs to hand 236) is positioned between the view origin and the polygons comprising hand 232, and thus should occlude those polygons in hand 232. Renderer 250 may then render objects 220 to display 290 consistent with the desired occlusion.

Figure 2B:
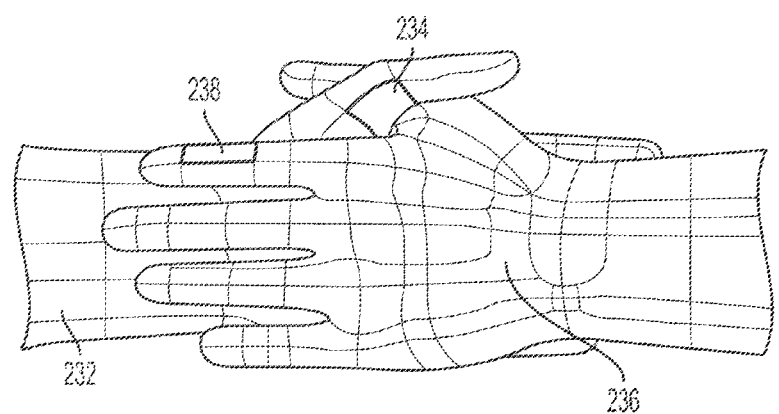
FIG. 2B shows an example renderer output corresponding to an example computer system according to examples of the disclosure.

FIG. 2B shows an example output of renderer 250 of the example computer system 200 shown in FIG. 2A. In the example described above with respect to FIG. 2A, based on the relative positions of objects 220, the viewer expects some objects (such as polygon 234) that comprise hand 232 to occlude hand 236, and some objects (such as polygon 238) that comprise hand 236 to occlude hand 232. The example output shown in FIG. 2B is consistent with the expected occlusions. That is, objects 220 in FIG. 2A are correctly displayed to present on display 290 a handshake consistent with a viewer's expectations.

In example computer system 200 shown in FIGS. 2A and 2B, scenegraph 240 is directly written to by only a single application, application 210. Renderer 250 then traverses scenegraph 240 to render hand 232 and hand 236 with proper occlusion. Traditional systems that use scenegraphs as part of a rendering process, such as example computer system 200, may not correctly occlude objects when a scenegraph (e.g., scenegraph 240) receives direct input from multiple independent applications. In these situations, unlike in the example computer system 200, there is no single application that can provide the scenegraph with all of the object relationship data that may be needed to correctly sort the objects on a display.

Figure 2C:
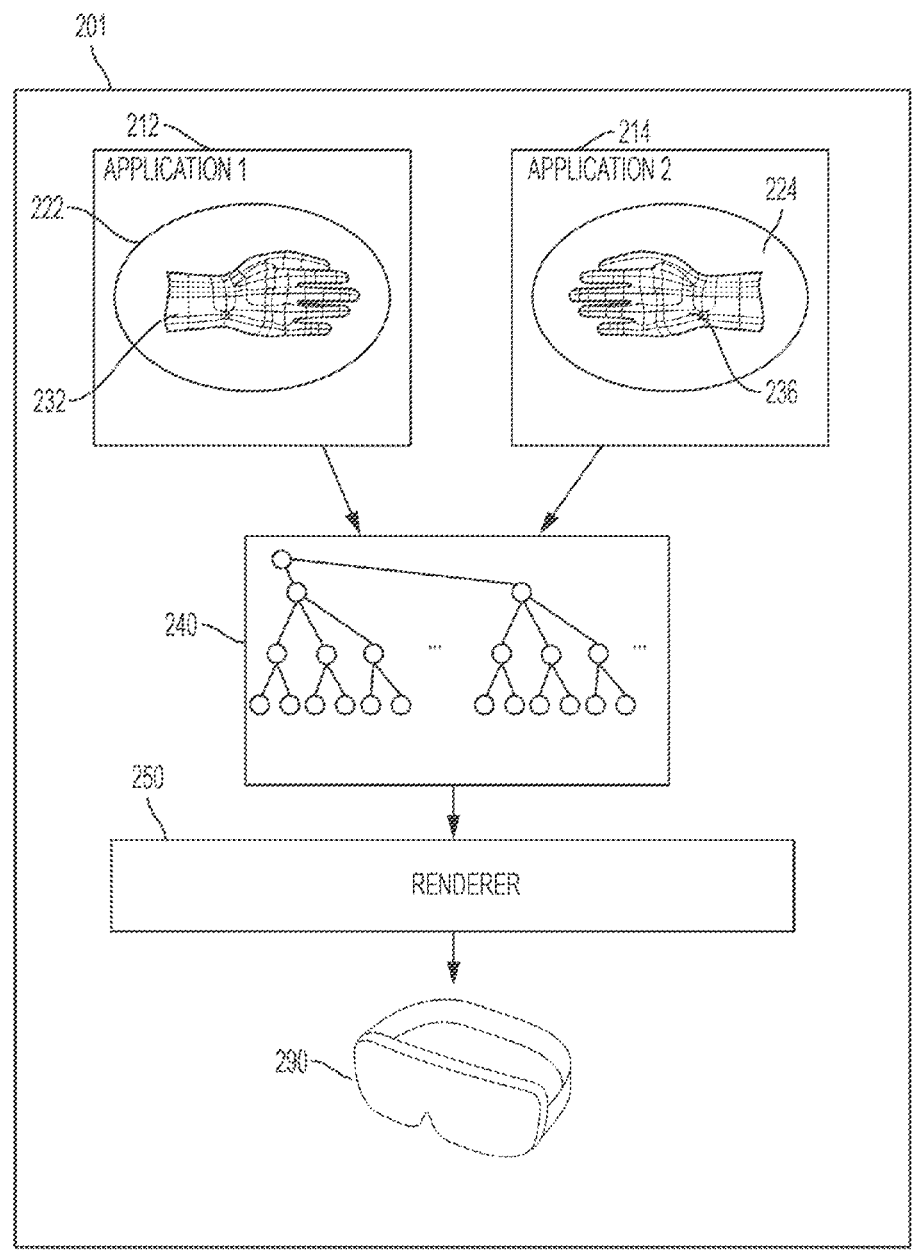
FIG. 2C shows an example flow of data in an example computer system that includes multiple independent applications according to examples of the disclosure.

FIG. 2C shows an example flow of data in an example computer system 201 using two independent applications, and illustrates the occlusion problem described above. Unlike example computer system 200 described above, example computer system 201 includes two independent applications, application 212 and application 214. In example computer system 201, application 212 and application 214 both write data to scenegraph 240 to render their respective 3D data to a single display 290. In FIG. 2C, application 212 attempts to render objects 222 (which include objects that comprise hand 232); and application 214 attempts to render objects 224 (which include objects that comprise hand 236). In this example, as in the example described in FIGS. 2A and 2B, hand 232 and hand 236, if displayed concurrently in the same 3D environment, would be interlocked in a handshake such that a viewer would expect portions of hand 232 to occlude hand 236, and portions of hand 236 to occlude hand 232.

The example shown in FIG. 2C may have difficulty achieving realistic occlusion of the objects to be rendered. In the example, application 212 can write data corresponding to objects 222 (including hand 232) to scenegraph 240, and application 214 can write data corresponding to objects 224 (including hand 236) to the same scenegraph 240. However, in example computer system 201, if application 212 and application 214 are independent ("sandboxed") applications, application 212 cannot access data relating to objects 224 of application 214 (including hand 236 and its constituent objects), and likewise, application 214 cannot access data relating to objects 222 of application 212 (including hand 232 and its constituent objects). That is, in some examples, neither application 212 nor application 214 can fully identify the relationships between objects 222 and objects 224. Thus, neither application 212 nor application 214 can write to scenegraph 240 the information that may be necessary to identify which objects occlude others, or in which order the objects should be sorted on the display.

Figure 2D:
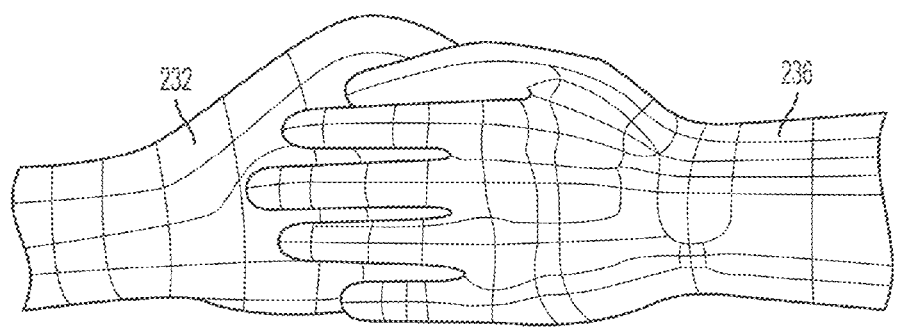
FIG. 2D shows an example renderer output corresponding to an example computer system that includes multiple independent applications according to examples of the disclosure.

FIG. 2D shows an example output of renderer 250 of the example computer system 201 shown in FIG. 2C. In the example described above with respect to FIG. 2C, based on the relative positioning of objects 222 and objects 224, the viewer expects some portions of hand 232 to occlude hand 236, and some portions of hand 236 to occlude hand 232. However, unlike in FIGS. 2A and 2B, scenegraph 240 of FIG. C is unable to correctly sort objects 222 and 224 to produce the desired occlusions, as described above. Instead, in the example shown, all of objects 222 are sorted on top of all of objects 224. The example output shown in FIG. 2D is not thus consistent with the expected occlusions. The resulting handshake image thus does not accurately reflect the objects in application 212 and application 214; the image additionally may look unnatural and may be confusing to a viewer.

Other disadvantages of traditional scenegraphs, such as scenegraph 240 in FIGS. 2A through 2D, when used with multiple independent applications, such as in example computer system 201, are evident. For example, rendering efficiencies can be realized using data corresponding to an entire scene to be rendered, such as in application 210 in FIG. 2A. By knowing which surfaces will be occluded, for instance, example computer system 200 in FIG. 2A can instruct system 200 to cull those surfaces, thereby avoiding unnecessary expenditure of computing resources. This culling may not be possible in multiple-application systems, such as example computer system 201 in FIG. 2C, because each application may not possess the scene knowledge to determine which surfaces should be culled. Furthermore, in some examples involving only a single application, such as example computer system 200, beneficial effects may be applied to objects based on the presence of other objects in a scene. For example, applying realistic lighting and shadowing effects to an object may require data corresponding to nearby objects. Further, some shader effects benefit from such data. Similarly, effects generated by particle systems or collision detection systems may benefit from such data. Such effects may be limited or impossible in systems where 3D data is provided by multiple independent applications, because no single application may be able to provide all of the node relationship information necessary to apply such effects.

The disclosure presents systems and methods that use a centralized scenegraph to addresses the above disadvantages of systems that render 3D data from multiple independent applications. A centralized scenegraph can be used in place of a traditional scenegraph, such as scenegraph 240 in FIG. 2C, in systems (such as example computer system 201 in FIG. 2C) in which multiple independent applications provide 3D data to be rendered. As described herein, in some examples, a centralized scenegraph can include a system that receives 3D data from multiple individual input sources; writes information corresponding to that 3D data to a central location; and maintains that information for access by a renderer that renders an image based on that 3D data. That graphical output may reflect realistic object occlusion; computational efficiencies; visual effects (such as lighting and shadowcasting); or physical effects (such as collision detection), that would otherwise be difficult or impossible to realize in systems not utilizing a centralized scenegraph.

In some examples, an example computer system includes a plurality of applications that each include 3D data that represents one or more objects in a common 3D environment. Each of the plurality of applications may exist in a "sandboxed" environment, such that it remains agnostic of other applications: for example, the data of each respective application may be independent of the data of each other application; each application may not have access to the data of each other application; and while 3D data of each of the applications may correspond to the same 3D environment, each application maintains its own instance of the 3D environment. For example, each application may represent a player in an online multiplayer video game, where each player exists in an instance of the same game world, or 3D environment, but lacks direct access to data of other players. It may be desirable in such examples for all players to be rendered simultaneously in a single instance of the game world, but it may be undesirable (or computationally prohibitive) for each player to maintain the information necessary to render the 3D data of each other client participant. Further, it may be desirable for security purposes to limit the information of a player that is available to other players.

In some examples, each of the plurality of sandboxed applications can independently write information corresponding to its 3D data to a local scenegraph, which information is later written to a common centralized scenegraph. The centralized scenegraph can then be traversed by a renderer, to render to a display an image based on the collective 3D data provided by each application. By communicating the 3D data from each of the plurality of sandboxed applications to a single centralized scenegraph, the renderer can apply beneficial techniques such as occlusion, lighting effects, and rendering optimizations (such as surface culling) that require or benefit from simultaneous knowledge of the 3D data of all applications. These benefits are realized while limiting the computational overhead required of each sandboxed application: from the perspective of a single application, all the application needs to do is update a single scenegraph to reflect its 3D data, with other operations performed by another component of the system. Further, security benefits can be obtained by maintaining separation between the sandboxed applications.

Figure 3A:
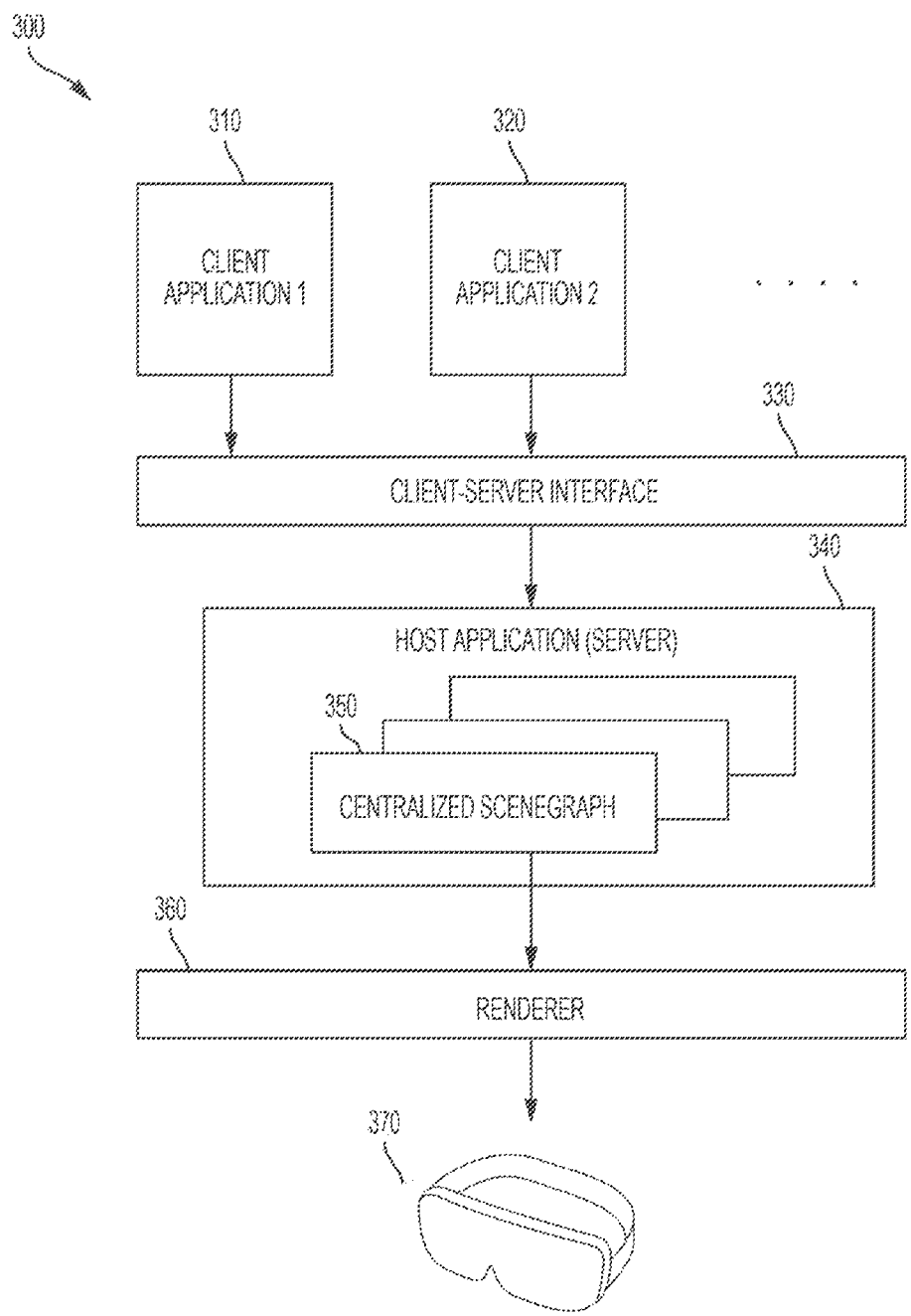
FIG. 3A illustrates components of an example computer system that can render 3D data from multiple independent applications to a display using a centralized scenegraph according to examples of the disclosure.

FIG. 3A illustrates components of an example computer system 300 that can render 3D data from multiple independent applications to a display using a centralized scenegraph. The example illustrated utilizes a client-server topology; however, the disclosure is not limited to client-server examples. In example computer system 300, a first client application 310 and a second client application 320 each communicate 3D data (in some examples, over a network) to a client-server interface 330. In some examples, client applications 310 and 320 are "sandboxed" applications that operate independently of each other, and independently communicate their 3D data to a client-server interface 330. Client-server interface 330 can receive updated 3D data from client applications 310 and 320, and communicate that 3D data (in some examples, over a network) to a server-side host application 340. In some examples, client-server interface 330 uses multithreading techniques to receive, process, and/or communicate 3D data to the host application 340 using multiple processor threads. In some examples, the client-server interface includes logic to control (such as by throttling) the rate at which 3D data is communicated to the host application 340. Host application 340 can use the 3D data received from the client-server interface to update centralized scenegraph 350, such that centralized scenegraph 350 reflects the 3D data received from client applications 310 and 320. In some examples, centralized scenegraph 350 comprises multiple versions of scenegraphs, and known versioning techniques are used to allow updates to the centralized scenegraph 350 to occur in parallel. Renderer 360 can then traverse the centralized scenegraph 350, apply optimizations and effects as appropriate, and generate graphical output to be displayed on a display 370, such as a computer monitor.

Figure 3B:
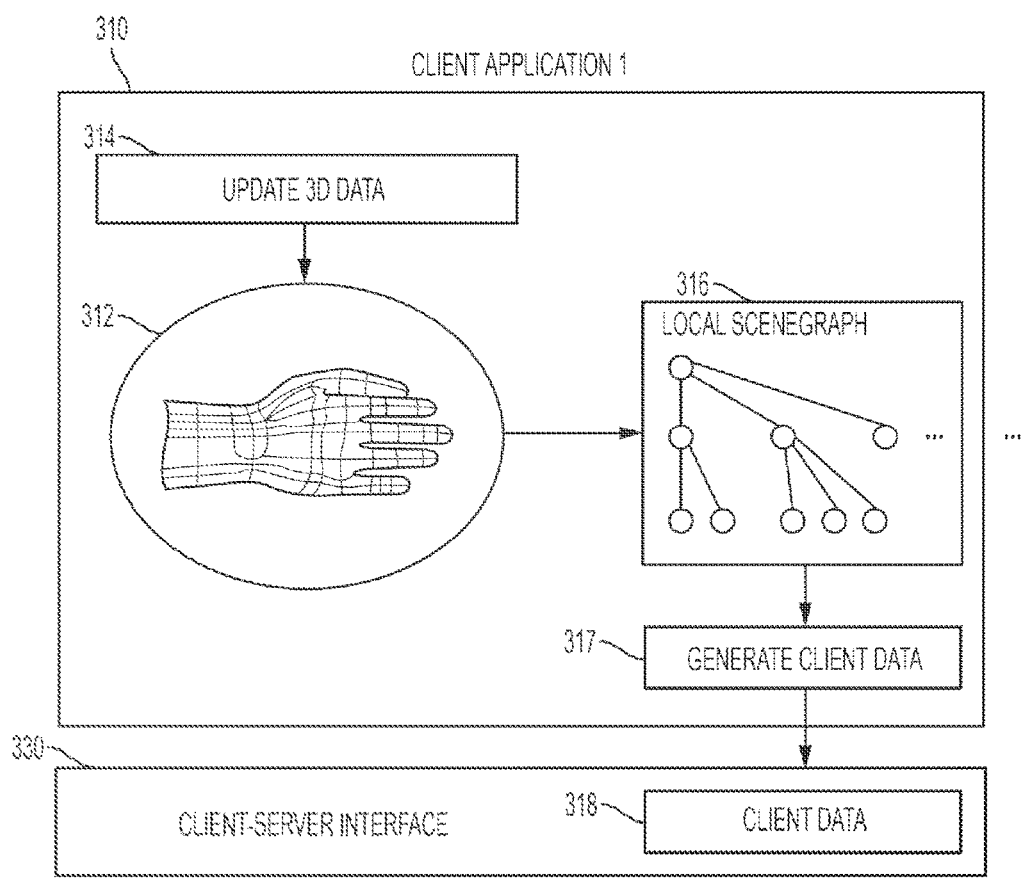
FIG. 3B illustrates aspects of an example client application with respect to an example computer system that includes multiple independent client applications according to examples of the disclosure.

FIG. 3B illustrates aspects of an example client application 310 with respect to example computer system 300 shown in FIG. 3A. In the example shown, 3D data 312 represents graphical objects (such as geometric primitives, e.g., polygons), in a 3D environment, that are to be drawn on a display 370. 3D data 312 may be updated (314) by client application 310. For example, if client application 310 is an application with a rendering loop that iterates sixty times per second, client application 310 may update 3D data 312 sixty times per second to reflect changes to that data during the application's course of operation that should be reflected in rendering output. In some examples, 3D data 312 is represented as a local scenegraph 316, which may be local to each client application 310. In some examples, local scenegraph 316 may include data (such as nodes) that correspond to data in centralized scenegraph 350. As 3D data 312 is updated (314), client application 310 can update local scenegraph 316 to reflect the most recent version of 3D data 312. As local scenegraph 316 is updated, it can be used by client application 310 to generate (317) client data 318. In some examples, client data 318 may represent local scenegraph 316 in its entirety. In some examples, client data 318 may represent changes made to local scenegraph 316 since the previous client data 318 was sent to client-server interface 330. For example, client data 318 might include nodes that were added to or deleted from local scenegraph 316; changes to relationships between nodes in local scenegraph 316; or changes to properties of nodes in local scenegraph 316. In some examples, client data 318 may use identifiers, such as identification numbers corresponding to scenegraph nodes, to identify relationships between data from local scenegraph 316 and corresponding data on centralized scenegraph 350. Client data 318 can then be communicated to client-server interface 330, for eventual communication to host application 340. In some examples, communication of client data 318 to client-server interface 330 may occur over a network. In some examples, a client helper application may be used in conjunction with client application 310 to generate client data 318 from local scenegraph 316, or from 3D data 312.

The aspects described with respect to client application 310 may similarly describe client application 320, or other client applications that (along with client application 310) comprise example computer system 300. It will be appreciated by those skilled in the art that the systems and methods described herein can be extended to include any number of client applications and client data, and the disclosure is not limited to any such number; further, some benefits (e.g., improvements in computational efficiency) may become more apparent with an increasing number of client applications. As described above, client applications 310 and 320 may be sandboxed applications that do not share data or functionality. For example, in example computer system 300, client application 320 may have its own 3D data and local scenegraph, independent of 3D data 312 and local scenegraph 316, belonging to client application 310. In some examples, however, including example computer system 300, a single client-server interface 300 is shared by multiple client applications, such as client applications 310 and 320.

Figure 3C:
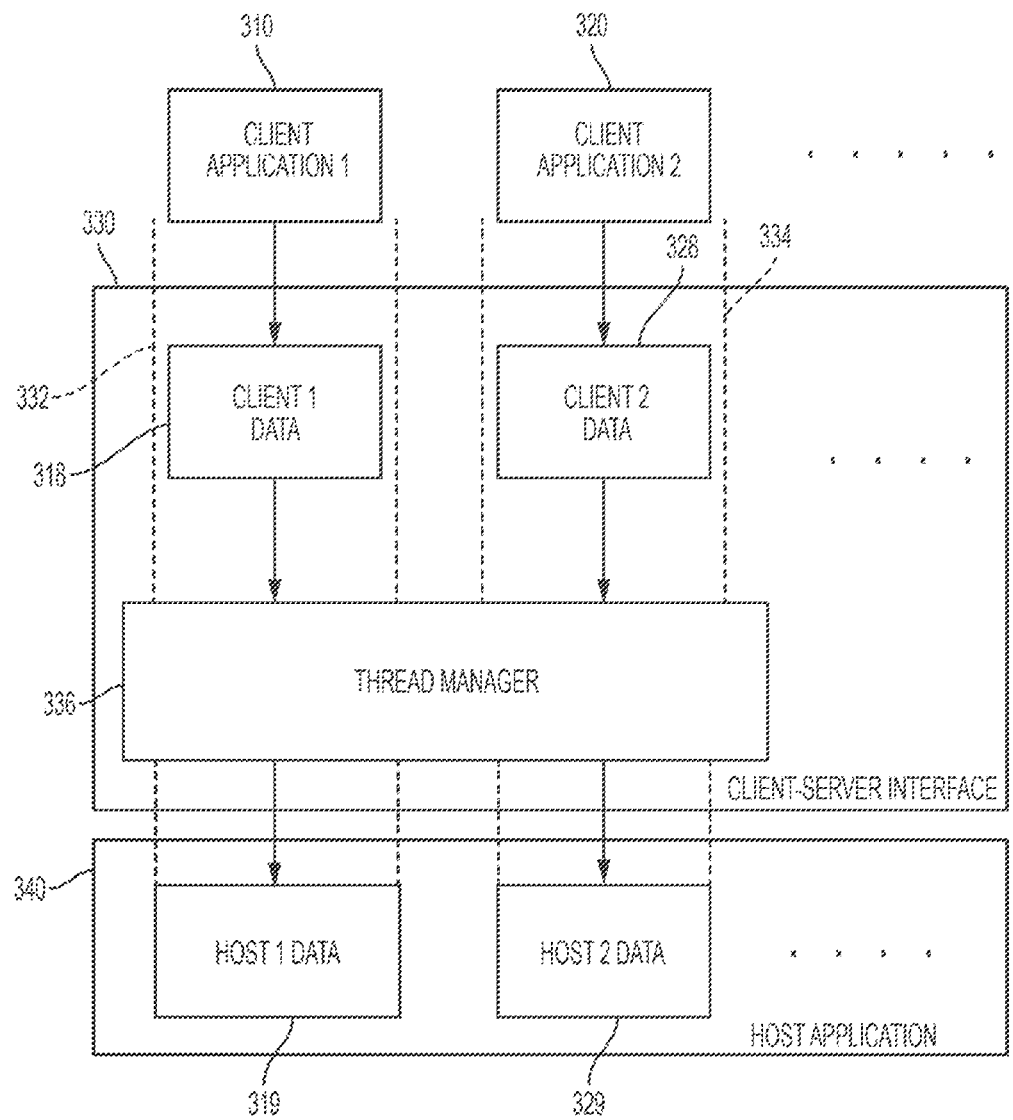
FIG. 3C illustrates aspects of an example client-server interface with respect to an example computer system that includes multiple independent applications according to examples of the disclosure.

FIG. 3C illustrates aspects of an example client-server interface 330 with respect to example computer system 300 shown in FIGS. 3A and 3B. In the example, client data 318 and client data 328 are client data communicated to, or updated by, respective client applications 310 and 320, as described above with respect to FIG. 3B. In some examples, client data 318 and 328 may be updated on client-server interface 330 at different rates. This may occur, for example, if one client application executes on less capable computing hardware than another client application (causing that client application to update its client data less frequently); if one client application communicates with client-server interface 330 over a lower-bandwidth network than another client application; or if the client data associated with one client application is more complex (and requires more processing time to generate) than the client data associated with another client application. Different rates of updating client data on client-server interface 330 may also be the result of temporary spikes in operating conditions, such as if a network outage causes a client application to temporarily go offline. It is desirable for example computer system 300 to tolerate different rates of updating client data; for example, it may be desirable that a network outage affecting one client application does not negatively impact the rate of updating centralized scenegraph 350 using client data from other client applications, or the rate at which scenes are rendered. It may also be desirable to ensure that, in updating centralized scenegraph 350, client data from one client application does not lag too far behind, or lead too far in front of, client data from other client applications, because this can result in destabilization or desynchronization of the centralized scenegraph or the rendered display with respect to the client applications.

In some examples, a role of client-server interface 330 is to handle differences or fluctuations in rates of updating client data. Referring to FIG. 3C, example client-server interface 330 may receive client data 318 and 328 via independent processing threads 332 and 334, respectively, and may include a thread manager 336 to handle the threads. Utilizing multiple threads to update client data from different sources, such as client application 310 and client application 320, can prevent problems with one source from blocking, or otherwise negatively affecting, data from other sources. In the example shown, thread manager 336 may input client data 318 and 328 from client applications 310 and 320 using threads 332 and 334, respectively, and output host data 319 and 329 (corresponding to client data 318 and 328, client applications 310 and 320, and threads 332 and 334, respectively) to host application 340. Thread manager 336 may include logic to process threads 332 and 334, to identify and address throughput problems or other problems relating to threads 332 and 334 and/or to control the output of host data 319 and 329. For example, if client data 318 and client data 328 are updating (via threads 332 and 334, respectively) at roughly the same rate, thread manager 336 may simply update host data 319 and 329 (corresponding to client data 318 and 319, respectively) at roughly the same rates. However, if client data 318 is updated at a much faster rate than client data 328, thread manager 336 may throttle client data 318 (for example, by communicating it less frequently to host application 340) to prevent it from far outpacing client data 328. Thread manager 336 may also control the overall rates at which host data is updated. For example, thread manager 336 may throttle the rates of updating host data 319 and/or 329 to prevent this host data from updating faster than host application 340 can process it (which could result in undesirable desynchronization of client applications 310 and/or 320, centralized scenegraph 350, and/or output to display 370).

Figure 3D:
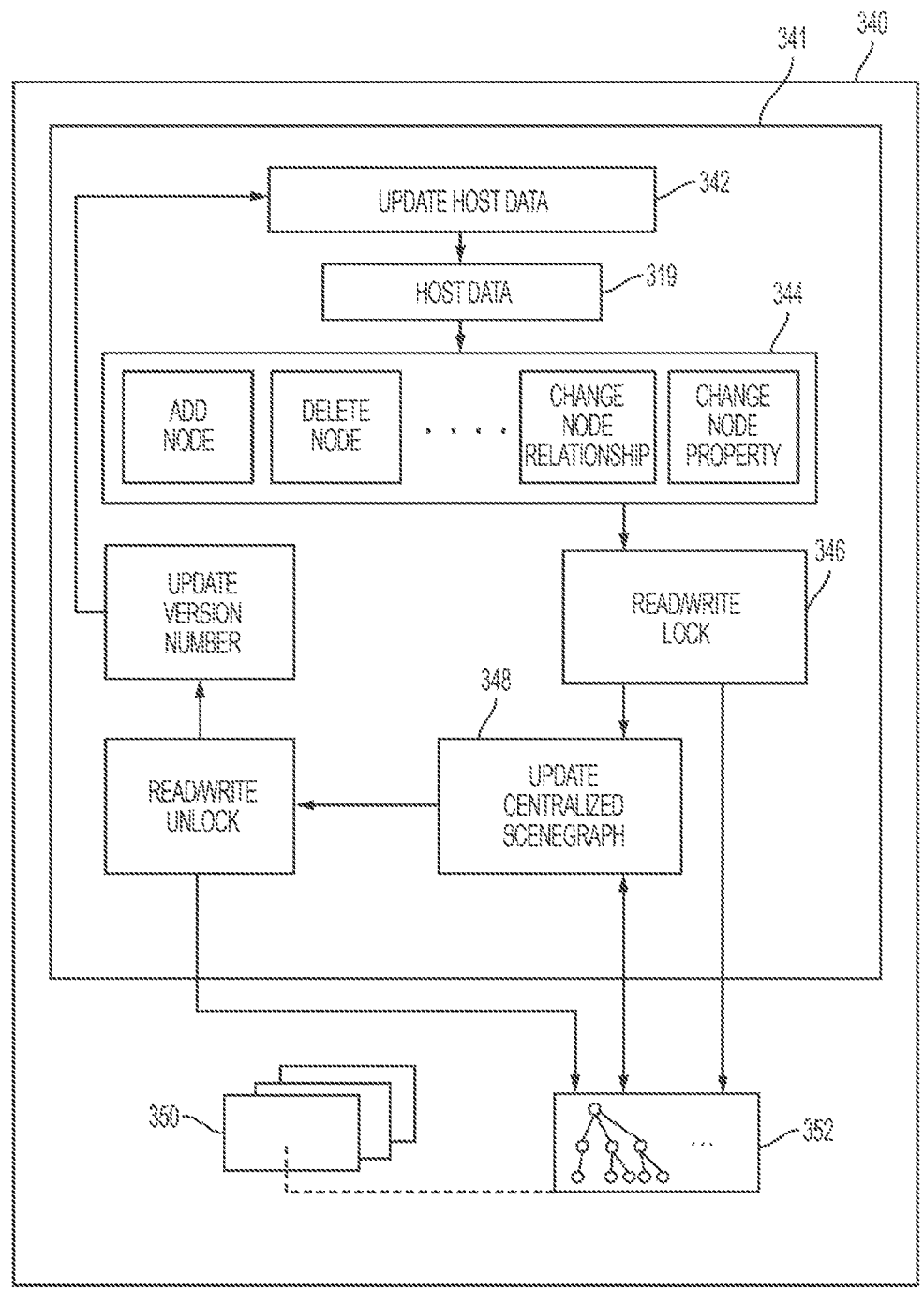
FIG. 3D illustrates aspects of an example host application 340 with respect to an example computer system that includes multiple independent client applications according to examples of the disclosure.

FIG. 3D illustrates aspects of an example host application 340 with respect to example computer system 300 shown in FIGS. 3A-3C. Described herein are operations executing within a thread 341 within host application 340, where thread 341 may execute concurrently with additional threads within host application 340. In some examples, multi-threaded processing within host application 340 may carry the advantage of allowing multiple client applications, or multiple sets of host data, to concurrently update the same centralized scenegraph 350 (in some examples, by updating different versions of the centralized scenegraph). This may in turn increase the overall throughput of client data to a rendered display. In some examples, multithreading may require that locks be placed on centralized scenegraph data, for instance to prevent threads from inadvertently writing to the same data. However, in some examples, one or more of the operations described may not execute within a thread.

In the example shown in FIG. 3D, host data 319 (corresponding to client application 310 and client data 318) is updated (342) as described above with respect to FIG. 3C. Host application 340 may then identify changes that host data 319 may make to a previous version of centralized scenegraph 350. For example, host application 340 may identify that, with respect to centralized scenegraph 350, host data 319 will add a node, delete a node, change a relationship between two nodes, or change a property of a node. (In some examples, such as the example shown in FIG. 3D, host application 340 may perform these operations or others using a host data handler 344.) Host application 340 may identify a version (352) of centralized scenegraph 350 to be created or updated in accordance with host data 319. In some examples, in advance of writing to version 352 of centralized scenegraph 350, host application 340 may lock that version to prevent other processes from modifying it concurrently. Host application 340 may make changes to version 352 to reflect host data 319 (for example, by adding or deleting scenegraph nodes in version 352 to correspond to host data 319). In some examples, host application 340 may then unlock version 352, and update a value (356) of a version number corresponding to version 352. Host application 340 may then update host data (342), and repeat the process shown in FIG. 3D. As the centralized scenegraph 350 is updated to reflect individual host data derived from individual client applications, the centralized scenegraph 350 will reflect the collective host data from multiple client applications—even though the individual client applications may be "sandboxed" and independent of each other.

Figure 3E:
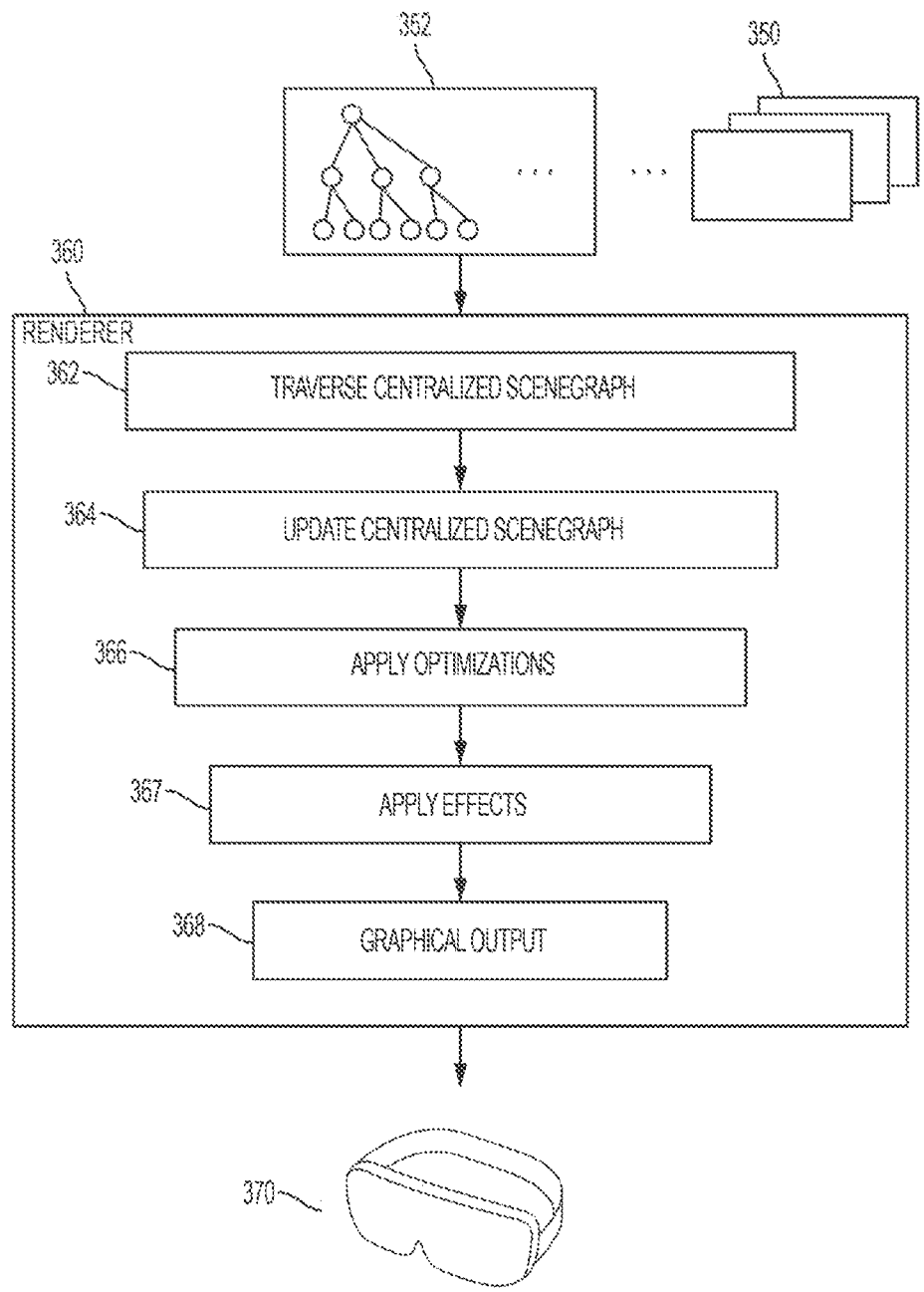
FIG. 3E illustrates aspects of an example renderer 360 with respect to an example computer system that includes multiple independent applications according to examples of the disclosure.

FIG. 3E illustrates aspects of an example renderer 360 with respect to example computer system 300 shown in FIGS. 3A-3D. In some examples, renderer 360 comprises part of host application 340. In some examples, renderer 360 may be part of another component of example computer system 300, or may be a separate component or application. In some examples, renderer 360 may be implemented in different physical hardware from one or more components of example computer system 300, and may communicate with one or more of those components over a network.

In the example shown in FIG. 3E, renderer 360 operates on a version 352 of centralized scenegraph 350. In the example, a role of the renderer is to render graphical output to a display 370 based on version 352 of centralized scenegraph 350. As part of this process, renderer 360 may traverse (362) version 352, using known scenegraph traversal techniques. During or after traversal 362, renderer 360 may update (364) the centralized scenegraph 350 as appropriate to reflect the results of the traversal. For example, as part of traversal 362, renderer 360 may identify orphaned nodes that should be deleted from the centralized scenegraph 350. Following traversal 362 and/or update 364, renderer 360 may apply various optimizations 366 to the scene. For example, renderer 360 may cull obscured or invisible surfaces to avoid expending unnecessary computational resources. Following traversal 362 and/or update 364, renderer 360 may apply one or more visual effects 367 to the scene. For example, in some examples, renderer 360 may apply lighting effects or shadow effects; apply one or more shaders; apply particle effects; and/or apply physical effects. Finally, renderer 360 can output data to a graphical output pipeline, the result of which can display graphical output on display 370.

The above example processes of a computer system may be provided by any suitable logic circuitry. Suitable logic circuitry may include one or more computer processors (e.g., CPU, GPU, etc.) that, when executing instructions implemented in a software program, perform the processes. Additionally, such processes can also be provided via corresponding logic design implemented in hardware logic circuitry, such as programmable logic (e.g., PLD, FPGA, etc.) or customized logic (e.g., ASIC, etc.) implementing logic designs that provide the processes. Furthermore, such processes can be provided via an implementation that combines both one or more processors running software and hardware logic circuitry.

Figure 4:
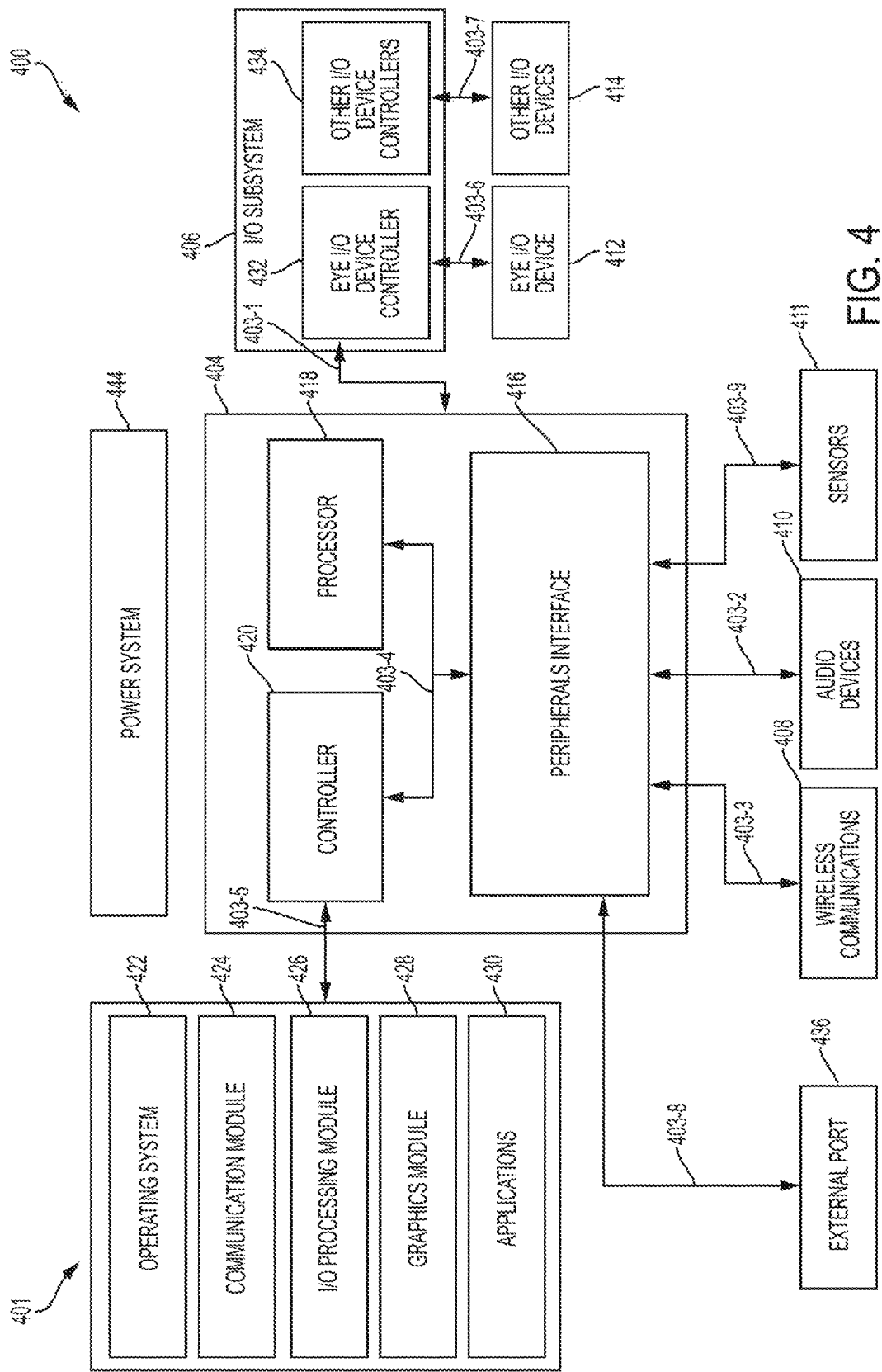
FIG. 4 illustrates an example of a system architecture that may be embodied within any portable or non-portable device according to examples of the disclosure.

FIG. 4 illustrates an example system 400 that may be used to implement any or all of the above examples. The above examples (in whole or in part) may be embodied within any portable device (including wearable device) or non-portable device—for example, a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, a head-mounted device (which may include, for example, an integrated display), or any other system or device adaptable to the inclusion of example system architecture 400, including combinations of two or more of these types of devices. The above examples may be embodied in two or more physically separate devices, such as two or more computers communicating via a wireless network. The above examples may be embodied in two or more physically different devices, such as a belt pack that communicates data to and/or from a head-mounted display. FIG. 4 is a block diagram of one example of system 400 that generally includes one or more computer-readable mediums 401, processing system 404, I/O subsystem 406, radio frequency (RF) circuitry 408, audio circuitry 410, and sensors circuitry 411. These components may be coupled by one or more communication buses or signal lines 403.

It should be apparent that the architecture shown in FIG. 4 is only one example architecture of system 400, and that system 400 could have more or fewer components than shown, or a different configuration of components. The various components shown in FIG. 4 can be implemented in hardware, software, firmware or any combination thereof, including one or more signal processing and/or application specific integrated circuits.

Referring to example system architecture 400 in FIG. 4, RF circuitry 408 can be used to send and receive information over a wireless link or network to one or more other devices and includes well-known circuitry for performing this function. RF circuitry 408 and audio circuitry 410 can be coupled to processing system 404 via peripherals interface 416. Interface 416 can include various known components for establishing and maintaining communication between peripherals and processing system 404. Audio circuitry 410 can be coupled to audio speaker 450 and microphone 452 and can include known circuitry for processing voice signals received from interface 416 to enable a user to communicate in real-time with other users. In some examples, audio circuitry 410 can include a headphone jack (not shown).

Sensors circuitry 411 can be coupled to various sensors including, but not limited to, one or more Light Emitting Diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, an electrooculography (EOG) sensor, and various system sensors which can sense remaining battery life, power consumption, processor speed, CPU load, and the like. In examples such as involving a head-mounted device, one or more sensors may be employed in connection with functionality related to a user's eye, such as tracking a user's eye movement, or identifying a user based on an image of his or her eye.

Peripherals interface 416 can couple input and output peripherals of the system to processor 418 and computer-readable medium 401. One or more processors 418 may communicate with one or more computer-readable mediums 401 via controller 44. Computer-readable medium 401 can be any device or medium (excluding signals) that can store code and/or data for use by one or more processors 418. In some examples, medium 401 can be a non-transitory computer-readable storage medium. Medium 401 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 401 may also include a transmission medium for carrying information-bearing signals indicative of computer instructions or data (but excluding the signals and excluding a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MANs) and the like.

One or more processors 418 can run various software components stored in medium 401 to perform various functions for system 400. In some examples, the software components can include operating system 422, communication module (or set of instructions) 424, I/O processing module (or set of instructions) 426, graphics module (or set of instructions) 428, and one or more applications (or set of instructions) 430. Each of these modules and above noted applications can correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various examples. In some examples, medium 401 may store a subset of the modules and data structures identified above. Furthermore, medium 401 may store additional modules and data structures not described above.

Operating system 422 can include various procedures, sets of instructions, software components and/or drivers for controlling and managing general system tasks (e.g., memory management, storage device control, power management, etc.) and facilitates communication between various hardware and software components.

Communication module 424 can facilitate communication with other devices over one or more external ports 436 or via RF circuitry 408 and can include various software components for handling data received from RF circuitry 408 and/or external port 436.

Graphics module 428 can include various known software components for rendering, animating and displaying graphical objects on one or more display surfaces. Display surfaces may include 2D or 3D displays. Display surfaces may be directly or indirectly coupled to one or more components of example system 400. In examples involving a touch sensing display (e.g., touch screen), graphics module 428 can include components for rendering, displaying, and animating objects on the touch sensing display. In some examples, graphics module 428 can include components for rendering to remote displays. In some examples, such as those incorporating a camera, graphics module 428 can include components for creating and/or displaying a image formed by compositing camera data (such as captured from a head-mounted camera) or photographic data (such as satellite-captured imagery) with rendered graphical objects. In some examples, graphics module can include components for rendering an image to a head-mounted display. In some examples, an image may include a view of an element of virtual content (e.g., an object in a three-dimensional virtual environment), and/or a view of the physical world (e.g., camera input indicating the user's physical surroundings). In some examples, a display may present a composite of virtual content and a view of the physical world. In some examples, the view of the physical world may be a rendered image; in some examples, the view of the physical world may be an image from a camera.

One or more applications 430 can include any applications installed on system 400, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

I/O subsystem 406 can be coupled to eye I/O device 412 and one or more other I/O devices 414 for controlling or performing various functions. For example, eye I/O device 412 can communicate with processing system 404 via eye I/O device controller 432, which can include various components for processing eye input (e.g., sensors for eye tracking) or user gesture input (e.g., optical sensors). One or more other input controllers 434 can receive/send electrical signals from/to other I/O devices 414. Other I/O devices 414 may include physical buttons, dials, slider switches, sticks, keyboards, touch pads, additional display screens, or any combination thereof.

I/O processing module 426 can include various software components for performing various tasks associated with eye I/O device 412 and/or other I/O devices 414, including but not limited to receiving and processing input received from eye I/O device 412 via eye I/O device controller 432, or from other I/O devices 414 via I/O controllers 434. In some examples, I/O devices 414 and/or I/O processing module 426 may perform various tasks associated with gesture input, which may be provided by tactile or non-tactile means. In some examples, gesture input may be provided by a camera or another sensor for detecting movements of a user's eyes, arms, hands, and/or fingers, for example. In some examples, I/O devices 414 and/or I/O processing module 426 may be configured to identify objects on a display with which the user wishes to interact—for example, GUI elements at which a user is pointing. In some examples, eye I/O device 412 and/or I/O processing module 426 may be configured (such as with the assistance of optical or EOG sensors) to perform eye tracking tasks, such as identifying an object, or a region on a display, at which the user is looking. In some examples, a device (such as a hardware "beacon") may be worn or held by a user to assist touch I/O device 412 and/or I/O processing module 426 with gesture-related tasks, such as identifying the location of a user's hands relative to a 2D or 3D environment. In some examples, eye I/O device 412 and/or I/O processing module 426 may be configured to identify a user based on sensor input, such as data from a camera sensor, relating to the user's eye.

In some examples, graphics module 428 can display visual output to the user in a GUI. The visual output may include text, graphics, video, and any combination thereof. Some or all of the visual output may correspond to user-interface objects. In some examples, I/O devices 412 and/or 414 and/or controllers 432 and/or 434 (along with any associated modules and/or sets of instructions in medium 401) can detect and track gestures and/or eye movements, and can convert the detected gestures and/or eye movements into interaction with graphical objects, such as one or more user-interface objects. In examples in which eye I/O device 412 and/or eye I/O device controller 432 are configured to track a user's eye movements, the user can directly interact with graphical objects by looking at them.

Feedback may be provided, such as by eye I/O device 412 or another I/O device 414, based a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 400 can also include power system 444 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 416, one or more processors 418, and memory controller 420 may be implemented on a single chip, such as processing system 404. In some other examples, they may be implemented on separate chips.

In some examples, a method is disclosed. The method may comprise: receiving, from a first client application of a computer system, a first graphical data comprising a first node; receiving, from a second client application of the computer system, a second graphical data comprising a second node; and generating a scenegraph, wherein: the scenegraph describes a relationship between the first node and the second node, and the scenegraph is configured to, when traversed by a processor of the computer system, render an output. Additionally or alternatively to one or more of the above examples, the method may further comprise traversing, by the processor of the computer system, the scenegraph. Additionally or alternatively to one or more of the above examples, the computer system may be configured to communicate with a display, and the method may further comprise displaying the output on the display. Additionally or alternatively to one or more of the above examples, the method may further comprise applying, at the computer system, an optimization to the output. Additionally or alternatively to one or more of the above examples, applying the optimization may comprise culling a surface. Additionally or alternatively to one or more of the above examples, the method may further comprise applying, at the computer system, a visual effect to the output. Additionally or alternatively to one or more of the above examples, applying the visual effect may comprise calculating a light value. Additionally or alternatively to one or more of the above examples, applying the visual effect may comprise executing a shader. Additionally or alternatively to one or more of the above examples, the method may further comprise applying, at the computer system, a physical effect to the output. Additionally or alternatively to one or more of the above examples, applying the physical effect may comprise detecting a collision. Additionally or alternatively to one or more of the above examples, the first client application may be a first application executing on the computer system, the second client application may be a second application executing on the computer system, and the first client application may be sandboxed on the computer system with respect to the second client application. Additionally or alternatively to one or more of the above examples, the first graphical data may correspond to a first client scenegraph associated with the first client application, the second graphical data may correspond to a second client scenegraph associated with the second client application, the first client scenegraph may be sandboxed on the computer system with respect to the second client scenegraph, the first client scenegraph may be sandboxed on the computer system with respect to the scenegraph, and the second client scenegraph may be sandboxed on the computer system with respect to the scenegraph. Additionally or alternatively to one or more of the above examples, the scenegraph may correspond to a version of a versioned scenegraph. Additionally or alternatively to one or more of the above examples, the first graphical data may be communicated to the scenegraph using a first processing thread of the computer system, and the second graphical data may be communicated to the scenegraph using a second processing thread of the computer system independent of the first processing thread.

In some examples, a method is disclosed. The method may comprise: traversing a scenegraph of a computer system with a display, wherein: the scenegraph comprises first 3D data associated with a first application, wherein the first 3D data comprises one or more nodes, the scenegraph comprises second 3D data associated with a second application, wherein the second 3D data comprises one or more nodes, the first application is sandboxed on the computer system with respect to the second application, and the scenegraph comprises a relationship between a node of the first 3D data and a node of the second 3D data; and displaying, on the display, an image corresponding to the scenegraph, wherein: the image corresponds to an output of traversing the scenegraph, and the image reflects the relationship. Additionally or alternatively to one or more of the above examples, the relationship may be a spatial relationship. Additionally or alternatively to one or more of the above examples, the method may further comprise applying, at the computer system, an optimization to the output of traversing the scenegraph. Additionally or alternatively to one or more of the above examples, applying the optimization may comprise culling a surface. Additionally or alternatively to one or more of the above examples, the method may further comprise applying, at the computer system, a visual effect to the output of traversing the scenegraph. Additionally or alternatively to one or more of the above examples, applying the visual effect may comprise calculating a light value. Additionally or alternatively to one or more of the above examples, applying the visual effect may comprise executing a shader. Additionally or alternatively to one or more of the above examples, the method may further comprise applying, at the computer system, a physical effect to the output of traversing the scenegraph. Additionally or alternatively to one or more of the above examples, applying the physical effect may comprise detecting a collision. Additionally or alternatively to one or more of the above examples, the scenegraph may correspond to a version of a versioned scenegraph. Additionally or alternatively to one or more of the above examples, graphical data corresponding to the first 3D data may be communicated to the scenegraph by a host application executing on the computer system. Additionally or alternatively to one or more of the above examples, graphical data corresponding to the first 3D data may be communicated to the host application by a client of the host application. Additionally or alternatively to one or more of the above examples, first graphical data corresponding to the first 3D data may be communicated to the scenegraph by a host application using a first processing thread, and second graphical data corresponding to the second 3D data may be communicated to the scenegraph by the host application using a second processing thread independent of the first processing thread.

In some examples, a computer system is disclosed. The system may comprise one or more processors; and memory storing instructions, which when executed by the one or more processors, cause the one or more processors to perform one or more of the methods described above.

In some examples, a non-transitory computer-readable storage medium is disclosed. The non-transitory computer-readable storage medium may store instructions that, when executed by one or more processors, cause the one or more processors to perform a method comprising: receiving, from a first client application of a computer system, a first graphical data comprising a first node; receiving, from a second client application of the computer system, a second graphical data comprising a second node; and generating a scenegraph, wherein: the scenegraph describes a relationship between the first node and the second node, and the scenegraph is configured to, when traversed by a processor of the computer system, render an output. Additionally or alternatively to one or more of the above examples, the method may further comprise traversing, by the processor of the computer system, the scenegraph. Additionally or alternatively to one or more of the above examples, the computer system may be configured to communicate with a display, and the method may further comprise displaying the output on the display. Additionally or alternatively to one or more of the above examples, the method may further comprise applying, at the computer system, an optimization to the output. Additionally or alternatively to one or more of the above examples, applying the optimization may comprise culling a surface. Additionally or alternatively to one or more of the above examples, the method may further comprise applying, at the computer system, a visual effect to the output. Additionally or alternatively to one or more of the above examples, applying the visual effect may comprise calculating a light value. Additionally or alternatively to one or more of the above examples, applying the visual effect may comprise executing a shader. Additionally or alternatively to one or more of the above examples, the method may further comprise applying, at the computer system, a physical effect to the output. Additionally or alternatively to one or more of the above examples, applying the physical effect may comprise detecting a collision. Additionally or alternatively to one or more of the above examples, the first client application may be a first application executing on the computer system, the second client application may be a second application executing on the computer system, and the first client application may be sandboxed on the computer system with respect to the second client application. Additionally or alternatively to one or more of the above examples, the first graphical data may correspond to a first client scenegraph associated with the first client application, the second graphical data may correspond to a second client scenegraph associated with the second client application, the first client scenegraph may be sandboxed on the computer system with respect to the second client scenegraph, the first client scenegraph may be sandboxed on the computer system with respect to the scenegraph, and the second client scenegraph may be sandboxed on the computer system with respect to the scenegraph. Additionally or alternatively to one or more of the above examples, the scenegraph may correspond to a version of a versioned scenegraph. Additionally or alternatively to one or more of the above examples, the first graphical data may be communicated to the scenegraph using a first processing thread of the computer system, and the second graphical data may be communicated to the scenegraph using a second processing thread of the computer system independent of the first processing thread.

In some examples, a non-transitory computer-readable storage medium is disclosed. The non-transitory computer-readable storage medium may store instructions that, when executed by one or more processors, cause the one or more processors to perform a method comprising: traversing a scenegraph of a computer system with a display, wherein: the scenegraph comprises first 3D data associated with a first application, wherein the first 3D data comprises one or more nodes, the scenegraph comprises second 3D data associated with a second application, wherein the second 3D data comprises one or more nodes, the first application is sandboxed on the computer system with respect to the second application, and the scenegraph comprises a relationship between a node of the first 3D data and a node of the second 3D data; and displaying, on the display, an image corresponding to the scenegraph, wherein: the image corresponds to an output of traversing the scenegraph, and the image reflects the relationship. Additionally or alternatively to one or more of the above examples, the relationship may be a spatial relationship. Additionally or alternatively to one or more of the above examples, the method may further comprise applying, at the computer system, an optimization to the output of traversing the scenegraph. Additionally or alternatively to one or more of the above examples, applying the optimization may comprise culling a surface. Additionally or alternatively to one or more of the above examples, the method may further comprise applying, at the computer system, a visual effect to the output of traversing the scenegraph. Additionally or alternatively to one or more of the above examples, applying the visual effect may comprise calculating a light value. Additionally or alternatively to one or more of the above examples, applying the visual effect may comprise executing a shader. Additionally or alternatively to one or more of the above examples, the method may further comprise applying, at the computer system, a physical effect to the output of traversing the scenegraph. Additionally or alternatively to one or more of the above examples, applying the physical effect may comprise detecting a collision. Additionally or alternatively to one or more of the above examples, the scenegraph may correspond to a version of a versioned scenegraph. Additionally or alternatively to one or more of the above examples, graphical data corresponding to the first 3D data may be communicated to the scenegraph by a host application executing on the computer system. Additionally or alternatively to one or more of the above examples, graphical data corresponding to the first 3D data may be communicated to the host application by a client of the host application. Additionally or alternatively to one or more of the above examples, first graphical data corresponding to the first 3D data may be communicated to the scenegraph by a host application using a first processing thread, and second graphical data corresponding to the second 3D data may be communicated to the scenegraph by the host application using a second processing thread independent of the first processing thread.

In some examples, a computer system is disclosed. The system may comprise one or more processors; and a storage configured to: receive, at the computer system from a first client application, first scene data, and receive, at the computer system from a second client application, second scene data; and memory storing instructions, which when executed by the one or more processors, cause the one or more processors to perform a method comprising: generating a graphical data structure based on the first scene data and the second scene data, the graphical data structure configured to, when provided as input to a rendering operation executed by the one or more processors, result in an output corresponding to an image on a display. Additionally or alternatively to one or more of the above examples, the graphical data structure may be at least one of a display list and a display tree. Additionally or alternatively to one or more of the above examples, the method may further comprise executing the rendering operation using the graphical data structure as input. Additionally or alternatively to one or more of the above examples, the computer system may further comprise a display, and the method may further comprise displaying the image on the display. Additionally or alternatively to one or more of the above examples, the first client application may be a first application executed by one or more processors of a first device, and the second client application may be a second application executed by the one or more processors of the first device. Additionally or alternatively to one or more of the above examples, the first client application may be a first application executed by one or more processors of a first device, and the second client application may be a second application executed by one or more processors of a second device. Additionally or alternatively to one or more of the above examples, the storage may be further configured to receive, from a third client application, third scene data. Additionally or alternatively to one or more of the above examples, the method may further comprise deleting the first scene data from the storage. Additionally or alternatively to one or more of the above examples, the graphical data structure may comprise a first data and a second data, and the method may further comprise: determining whether the first data corresponds to an occluded view or an unoccluded view; in response to a determination that the first data corresponds to an unoccluded view, rendering, based on the first data, an image comprising the unoccluded view; and in response to a determination that the first data corresponds to an occluded view, rendering an image not comprising the occluded view. Additionally or alternatively to one or more of the above examples, the storage may be further configured to, in response to receiving the first scene data, store the first scene data as a first version in a version control system. Additionally or alternatively to one or more of the above examples, the storage may be further configured to: receive, from the first client application, third scene data; and store the third scene data as a second version in the version control system. Additionally or alternatively to one or more of the above examples, the method may further comprise in response to generating the graphical data structure, deleting the first version from the storage. Additionally or alternatively to one or more of the above examples, the method may be performed in parallel with the storage receiving the third scene data. Additionally or alternatively to one or more of the above examples, the storage may be configured to receive the first scene data in parallel with receiving the second scene data. Additionally or alternatively to one or more of the above examples, the storage may be configured to receive the third scene data at a first interval corresponding to a first data rate, and the method may further comprise adjusting a length of the first interval to correspond to a second data rate. Additionally or alternatively to one or more of the above examples, the first scene data may comprise at least one of new data, deleted data, and a change in a relationship between data.

In some examples, a computer system is disclosed. The computer system may comprise a server, server data, a first client application, and a second client application, and may be configured to: receive, at the server, a first unprocessed scene data from the first client application; receive, at the server, a second unprocessed scene data from the second client application; incorporate, at the server, the first unprocessed scene data from the first client application, the second unprocessed scene data from the second client application, and the server data into a centralized scene data structure; execute, at the server, at least a portion of the data contained within the centralized scene data structure; and create a graphical data structure based on the data that was executed within the centralized scene data structure. Additionally or alternatively to one or more of the above examples, the graphical data structure may be a display list or a display tree. Additionally or alternatively to one or more of the above examples, the computer system may further comprise a rendering engine configured to render the graphical data structure into a processed image. Additionally or alternatively to one or more of the above examples, the computer system may further comprise a display configured to display the processed image. Additionally or alternatively to one or more of the above examples, the display may be capable of displaying virtual content while maintaining at least a partial view of the physical world. Additionally or alternatively to one or more of the above examples, the first client application and the second client application may be two different applications running on a single physical device. Additionally or alternatively to one or more of the above examples, the first client application and the second client application may be two different applications, each running on separate physical devices. Additionally or alternatively to one or more of the above examples, the server may be configured to receive a third unprocessed scene data from a third client application. Additionally or alternatively to one or more of the above examples, the server may be configured to delete the unprocessed scene data from the first client application after execution of the unprocessed scene data from the first client application. Additionally or alternatively to one or more of the above examples, the rendering engine may further comprise an occlusion module, the occlusion module configured to separate data within the graphical data structure into a first occluded category and a second unoccluded category and display the second unoccluded category. Additionally or alternatively to one or more of the above examples, the server may be configured to store the first unprocessed scene data from the first client application as a first version. Additionally or alternatively to one or more of the above examples, the server may be configured to store a third unprocessed scene data from the first client application as a second version. Additionally or alternatively to one or more of the above examples, the computer system may be configured to store the first version of the first unprocessed scene data from the first client application from the time the first version of the first unprocessed scene data from the first client application is received by the server until the time the first unprocessed scene data from the first client application is read and executed. Additionally or alternatively to one or more of the above examples, the server may be configured to receive the first unprocessed scene data from the first client at the same time the server receives the second unprocessed scene data from the second client. Additionally or alternatively to one or more of the above examples, the server may be configured to slow down a rate at which the first client application sends unprocessed scene data to the server. Additionally or alternatively to one or more of the above examples, the data received from the first and second client applications may be at least one selected from the group consisting of new data, deleted data, changes in relationship between previously transferred data, and modified data.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A system comprising:
one or more processors configured to perform a method comprising:
   receiving, from a first client application of a computer system, a first graphical data comprising a plurality of first nodes;
   receiving, from a second client application of the computer system, a second graphical data comprising a plurality of second nodes;
   generating a scenegraph, wherein:
      the scenegraph describes a first occlusion relationship between at least one first node of the plurality of first nodes and at least one second node of the plurality of second nodes,
      the scenegraph further describes a second occlusion relationship between at least one third node of the plurality of first nodes and at least one fourth node of the plurality of second nodes; and
      the scenegraph is configured to create a rendered scene based on the first occlusion relationship, wherein at least one second node occludes at least one first node such that a first portion of the second graphical data occludes a first portion of the first graphical data, and based further on the second occlusion relationship, wherein at least one third node occludes at least one fourth node such that a second portion of the first graphical data occludes a second portion of the second graphical data.

2. The system of claim 1, wherein creating the rendered scene comprises traversing the scenegraph.

3. The system of claim 1, the method further comprising displaying the rendered scene, wherein displaying the rendered scene comprises displaying at least one first node of the plurality of first nodes and displaying at least one second node of the plurality of second nodes.

4. The system of claim 1, wherein the first client application comprises a first application executing on the computer system and the second client application comprises a second application executing on the computer system.

5. The system of claim 4, wherein the first client application is sandboxed on the computer system with respect to the second client application.

6. The system of claim 1, wherein the first client application comprises an application executing on a second computer system, the second computer system in communication with the computer system via a network, and receiving the scenegraph from the computer system comprises receiving the scenegraph at the second computer system from the computer system via the network.

7. The system of claim 1, wherein the scenegraph corresponds to a version of a versioned scenegraph.

8. The system of claim 1, wherein the first graphical data is communicated to the scenegraph using a first processing thread of the computer system, and the second graphical data is communicated to the scenegraph using a second processing thread of the computer system independent of the first processing thread.

9. The system of claim 1, wherein the method further comprises:
   identifying a scenegraph to be updated based on a first updated graphical data from the first client application and further based on a second updated graphical data from the second client application;
   locking the scenegraph with respect to the second updated graphical data;

modifying the scenegraph with respect to the first updated graphical data;
unlocking the scenegraph with respect to the second updated graphical data; and
modifying the scenegraph based on the second updated graphical data.

10. A non-transitory computer-readable medium comprising instructions which, when executed by one or more processors, cause the one or more processors to perform a method comprising:
receiving, from a first client application of a computer system, a first graphical data comprising a plurality of first nodes;
receiving, from a second client application of the computer system, a second graphical data comprising a plurality of second nodes;
generating a scenegraph, wherein:
the scenegraph describes a first occlusion relationship between at least one first node of the plurality of first nodes and at least one second node of the plurality of second nodes,
the scenegraph further describes a second occlusion relationship between at least one third node of the plurality of first nodes and at least one fourth node of the plurality of second nodes; and
the scenegraph is configured to create a rendered scene based on the first occlusion relationship, wherein at least one second node occludes at least one first node such that a first portion of the second graphical data occludes a first portion of the first graphical data, and based further on the second occlusion relationship, wherein at least one third node occludes at least one fourth node such that a second portion of the first graphical data occludes a second portion of the second graphical data.

11. The non-transitory computer-readable medium of claim 10, wherein creating the rendered scene comprises traversing the scenegraph.

12. The non-transitory computer-readable medium of claim 10, the method further comprising displaying the rendered scene, wherein displaying the rendered scene comprises displaying at least one first node of the plurality of first nodes and displaying at least one second node of the plurality of second nodes.

13. The non-transitory computer-readable medium of claim 10, wherein the first client application comprises a first application executing on the computer system and the second client application comprises a second application executing on the computer system.

14. The non-transitory computer-readable medium of claim 13, wherein the first client application is sandboxed on the computer system with respect to the second client application.

15. The non-transitory computer-readable medium of claim 10, wherein the first client application comprises an application executing on a second computer system, the second computer system in communication with the computer system via a network, and receiving the scenegraph from the computer system comprises receiving the scenegraph at the second computer system from the computer system via the network.

16. The non-transitory computer-readable medium of claim 10, wherein the scenegraph corresponds to a version of a versioned scenegraph.

17. The non-transitory computer-readable medium of claim 10, wherein the first graphical data is communicated to the scenegraph using a first processing thread of the computer system, and the second graphical data is communicated to the scenegraph using a second processing thread of the computer system independent of the first processing thread.

18. The non-transitory computer-readable medium of claim 10, wherein the method further comprises:
identifying a scenegraph to be updated based on a first updated graphical data from the first client application and further based on a second updated graphical data from the second client application;
locking the scenegraph with respect to the second updated graphical data;
modifying the scenegraph with respect to the first updated graphical data;
unlocking the scenegraph with respect to the second updated graphical data; and
modifying the scenegraph based on the second updated graphical data.

* * * * *